(12) United States Patent
Sunakawa et al.

(10) Patent No.: US 6,310,662 B1
(45) Date of Patent: *Oct. 30, 2001

(54) DISPLAY METHOD AND APPARATUS HAVING DISTORTION CORRECTION

(75) Inventors: Shinichi Sunakawa, Kawasaki; Kazutoshi Shimada, Yokosuka; Eisaku Tatsumi, Kawasaki; Shigeki Mori, Koshigaya; Kazuhiro Matsubayashi; Takashi Harada, both of Yokohama; Katsuhiko Nagasaki, Ichikawa; Ryoji Fukuda, Yokohama, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/490,645

(22) Filed: Jun. 15, 1995

(30) Foreign Application Priority Data

Jun. 23, 1994 (JP) ...................................... 6-141482

(51) Int. Cl.⁷ ...................................... H04N 9/28
(52) U.S. Cl. ........................................... 348/747; 348/745
(58) Field of Search .................................. 348/745, 746, 348/747, 806, 807; 315/368.13; H04N 9/31, 9/28

(56) References Cited

U.S. PATENT DOCUMENTS

| | | | | |
|---|---|---|---|---|
| 4,684,996 | * | 8/1987 | Baumeister | 348/747 |
| 4,857,998 | * | 8/1989 | Tsujihara et al. | 348/747 |
| 5,200,815 | * | 4/1993 | Tsujihara et al. | 348/746 |
| 5,455,647 | * | 10/1995 | Fujiwara | 348/745 |
| 5,475,447 | * | 12/1995 | Funado | 348/746 |
| 5,483,299 | * | 1/1996 | Minoura | 348/747 |

FOREIGN PATENT DOCUMENTS

| | | |
|---|---|---|
| 0 454 451 | 10/1991 | (EP) . |
| 2 271 906 | 4/1994 | (GB) . |
| 4-355740 | 12/1992 | (JP) . |

* cited by examiner

*Primary Examiner*—Michael Lee
(74) *Attorney, Agent, or Firm*—Fitzpatrick, Cella, Harper & Scinto (57) ABSTRACT

A display method and apparatus for displaying information by projecting a light onto an external projection plane is capable of detecting a deviation amount of a displayed image projected on the projection plane with respect to the display apparatus. Output image data is changed based on the detected deviation amount to offset a distortion of the displayed image, which is displayed using the changed output image data.

8 Claims, 9 Drawing Sheets

DISPLAY METHOD AND APPARATUS HAVING DISTORTION CORRECTION

BACKGROUND OF THE INVENTION

1. Field of the Invention

The invention relates to display method and apparatus for displaying information by projecting a light onto an external projection plane.

2. Related Background Art

Hitherto, various kinds of projector application equipment have been known as display apparatuses for displaying information by projecting a light onto a projection plane. Among them, as a display apparatus for projecting an image from the front side of the projection plane, an auto focusing type projector has been realized. As a display apparatus for projecting an image from the rear side of the projection plane, a television of the rear projection type has been realized.

A mechanism for adjusting a picture quality of the projection plane in each of those display apparatuses will now be described.

The auto-focusing type projector outputs an image by projecting the light onto the external projection plane in a manner similar to the overhead projector (OHP). An image output system is constructed by a plurality of optical lenses and can adjust a focal distance in accordance with a distance to the projection plane. The focal distance is adjusted by changing the distance between the projection plane and the lens by a built-in motor. The distance between the projection plane and the optical system in such an apparatus is generally detected by measuring a distance in an optical axis direction of the projector through a lens system. Its mechanism will now be described hereinbelow.

The measuring mechanism of the distance in the above display apparatus comprises: a light emitting device for outputting a reference light of an infrared wavelength in the direction of the optical axis of the projector; and a photosensitive device for detecting a reflected light through a lens system. The photosensitive device is a surface photosensing type device (SPD) whose output changes in dependence on a photosensing area. In the above construction, in the case where focal distances of the projection plane and the lens system are coincident, the photosensing area of the photosensitive device is minimum. When the focal distance is improper, the photosensing area of the photosensitive device is widened and detected. Therefore, a processing system of the distance detecting mechanism feedback controls the lens system motor on the basis of an output of the photosensitive device and corrects and drives the optical system, thereby adjusting so as to obtain a correct focal distance.

The television of the rear projector type will now be described. According to the display apparatus, by enlargedly projecting a television image onto a projection film plane provided in the front portion of the apparatus, a large projection display of 50 to 100 inches is realized.

A construction in the apparatus will now be described. To reduce the installing area, an optical path is changed by using a mirror, a prism, and the like. Thus, the optical axis of the light entering the projection film plane has an angle and a distortion occurs on the display screen. To prevent such a problem, the distortion is corrected in the optical system. In the above construction, since the positional relation between the projection film plane and the optical system is fixed, a distortion of the same state always occurs. In the display apparatus, therefore, a method of correcting the distortion by devising the shapes of the lens and prism is realized. That is, by setting magnifications and angles of the lens and prism in accordance with the optical path of the apparatus, the above distortion is corrected.

Further, a zoom lens of a camera is known as an apparatus which can change an image magnification. In such an apparatus, a picture plane can be arbitrarily enlarged or reduced by the motion of a built-in motor or a manual operation. A change in image magnification is realized by changing intervals among a plurality of lenses constructing the zoom lens.

In the above conventional apparatuses, however, when the distance from the projection plane changes, there is a problem such that when the direction of a normal line of the projection plane and the direction of the optical axis of the output light are deviated, a distortion occurs in the image. Namely, in the general display apparatus, for example, sizes of characters in the upper and lower portions of the display screen differ or a figure is distorted due to the distortion of the image as mentioned above. A construction to correct such a distortion is not provided in the conventional apparatuses.

SUMMARY OF THE INVENTION

The invention is made in consideration of the above problems and it is an object of the invention to provide a display method and apparatus in which image data can be changed and displayed so as to correct a distortion of a display image which occurs due to a deviation of the direction of an optical axis of a projection light and the direction of a normal line of a projection plane, a picture quality of the display image is raised, and a use efficiency is improved.

Another object of the invention is to provide a display method and apparatus in which a change amount of image data to set off (i.e., offset) a deviation of a display image which occurs on the basis of a distortion of an optical axis direction of a projection light and a normal line direction of a projection plane is determined by detecting a distortion of an image displayed on the projection plane, thereby enabling a more suitable change amount of the image data to be obtained.

To accomplish the above object, according to the invention, there is provided a display apparatus for displaying information by projecting a light onto an external projection plane, comprising: for example, detecting means for detecting a deviation amount between the direction of an optical axis of a projection light from the display apparatus and the direction of a normal line of the projection plane; changing means for changing output image data so as to set off a distortion of the display image in association with the deviation amount on the basis of the deviation amount detected by the detecting means; and display means for displaying an image by using the image data changed by the changing means.

According to the above construction, on the basis of the deviation amount between the normal line of the projection plane and the optical axis of the display apparatus, the output image data is changed so as to set off the distortion of the display image in association with the deviation amount. The image is displayed by the changed image data.

Preferably, the detecting means measures the distances among at least three points on the projection plane and the display apparatus, thereby detecting the deviation amount of the directions between the optical axis of the projection light and the normal line of the projection plane. By measuring the distances to three points on the projection plane, inclinations in the vertical and lateral directions of the projection planes can be detected. The image can be corrected in the vertical and lateral directions.

Preferably, the detection of the deviation amount by the detecting means is periodically executed at a predetermined time interval. Even when the positional relation between the display apparatus and the projection plane during the image display changes, the apparatus can automatically cope with such a situation and an image display at a high quality can be held.

According to the invention, the above object is accomplished by a display apparatus for displaying information by projecting a light onto an external projection plane, comprising: obtaining means for repeating processes to fetch an image displayed on the projection plane, detect its distortion, correct image data so as to eliminate the distortion, and display the image onto the projection plane, thereby obtaining a proper correction amount to solve such a distortion; changing means for changing output image data on the basis of the correction amount obtained by the obtaining means; and display means for displaying the image onto the projection plane by using the output image data changed by the changing means.

According to the above construction, the image displayed on the projection plane is fetched, its distortion is detected, and a proper correction amount to solve such a distortion is obtained. In the subsequent image display, the image data is changed by the correction amount and the image is displayed on the projection plane.

Preferably, the obtaining means has: fetching means for displaying a test pattern on the projection plane and fetching the test pattern image; detecting means for detecting a distortion of the test pattern image by comparing the test pattern image fetched by the fetching means and an original test pattern; and test pattern changing means for changing the image data of the test pattern on the basis of the distortion detected by the detecting means, wherein the processes of the fetching means, detecting means, and changing means are repeated until the distortion of the test pattern image fetched by the fetching means is smaller than a predetermined magnitude, thereby obtaining a proper correction amount of the image. This is because, by obtaining a correction amount by using a predetermined test pattern, the processes can be easily executed at a high speed.

More preferably, the test pattern is constructed by a plurality of straight lines which cross perpendicularly with each other. The detecting means detects the distortion of the test pattern image on the basis of intersection angles of the straight lines in the test pattern image. This is because a distortion amount and the like are obtained by simple numerical value calculations and the processes can be easily executed at a high speed.

DETAILED DESCRIPTION OF THE PREFERRED EMBODIMENTS

[Embodiment 1]

A preferred embodiment according to the present invention will now be described in detail hereinbelow with reference to the drawings.

<Explanation of an apparatus construction (FIGS. 1 and 2)>

Figure 1:
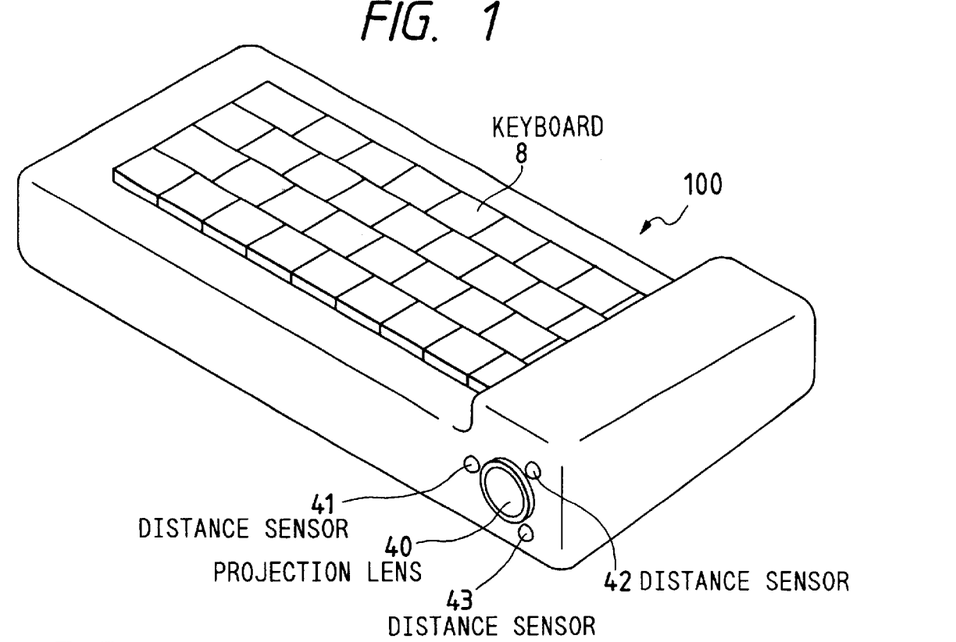
FIG. 1 is a perspective view showing an outline of a display apparatus in the embodiment.

FIG. 1 is a perspective view showing an outline of a display apparatus in an embodiment. A display apparatus 100 of the embodiment is a portable personal computer using a projection type display (liquid crystal projector) as a display device. An input by the user is executed by a keyboard on the main body of the apparatus. An echo back of the input or an output image from the computer is displayed by the projector. As a projection plane of the projector, an exclusive-use display plate or screen, a wall, or the like can be used.

In FIG. 1, reference numeral 8 denotes a keyboard for executing various kinds of data inputs; 40 a projection lens for outputting a projection light of the projector; and 41 to 43 distance sensors for measuring distances to the projection plane. Each distance sensor is constructed by using an ultrasonic wave in the embodiment 1. The distance sensors 41 to 43 are arranged so that the measuring directions are deviated. Namely, each measuring direction is set so that the sensor 41 measures the distance to the right upper position of the projection plane, the sensor 42 measures the distance to the left upper position, and the sensor 43 measures the distance to the left lower position, respectively.

Figure 2:
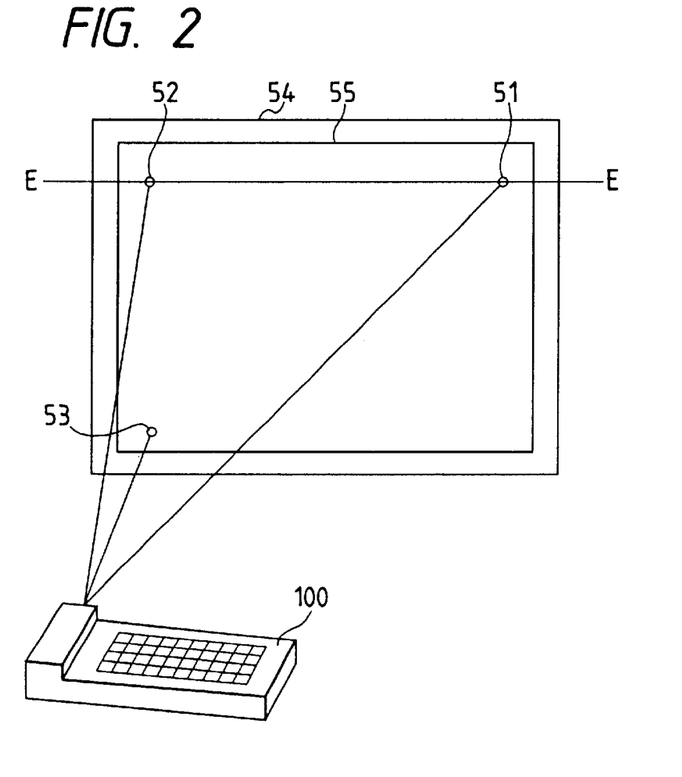
FIG. 2 is a diagram showing the relation between a projection plane and measuring points of sensors.

FIG. 2 is a diagram showing the relation between the projection plane and the measuring points of the sensors. Reference numeral 54 denotes a projection plane using a wall surface or the like. A projection light from the projection lens 40 is projected onto the projection plane 54, so that an image is displayed. Reference numeral 55 denotes a display area to be outputted by the projector; 51 a point at which the distance sensor 41 measures the distance; and similarly, 52 and 53 points which are set so that the distance sensors 42 and 43 measure the distances, respectively. Namely, the distance sensors 41 to 43 measure the distances of three points (51 to 53) of the edge portions of the display area of the projector, respectively.

<Explanation of circuit construction (FIGS. 4 to 5)>

Figure 3:
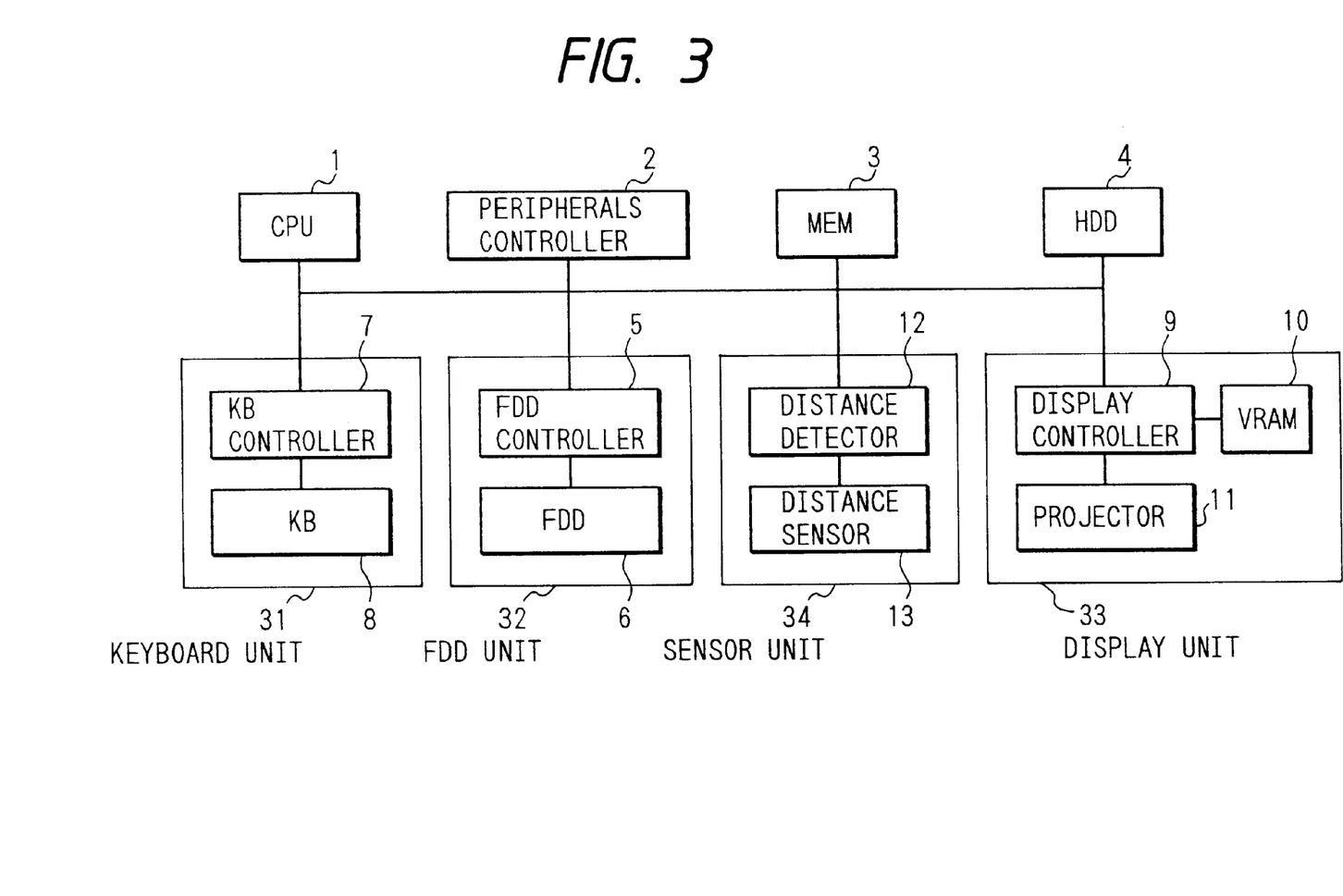
FIG. 3 is a block diagram showing a control construction in a display apparatus of the embodiment 1.

A circuit construction of the apparatus of the embodiment will now be described. FIG. 3 is a block diagram showing a control construction in the display apparatus of the embodiment 1.

In the diagram, reference numeral 1 denotes a CPU for controlling the whole display apparatus 100. The CPU 1 executes processes such as arithmetic operation, I/O control, or the like in accordance with programs stored in a memory 3. Reference numeral 2 denotes a peripherals controller which is used in combination with the CPU 1 and controls I/O (serial communication, parallel communication, real-time clock, timer, interruption control, DMA control, etc.) which are necessary to control the peripherals. The memory 3 includes memories such as DRAM, cache RAM, ROM, etc. as main memories. Reference numeral 4 denotes a hard disk drive (HDD) to store user data, a set state of the apparatus, and the like.

Reference numeral 31 denotes a keyboard unit having the keyboard 8 and a keyboard controller 7 for performing input/output control from the keyboard 8; 32 an FDD unit having a floppy disk drive 6 and an FDD controller 5 for executing data input/output controls from the floppy disk drive 6; and 34 a sensor unit having a distance sensor 13 for generating an ultrasonic wave and receiving its reflected wave and a distance detector 12 to detect a distance by an ultrasonic wave system on the basis of a signal from the distance sensor 13. As mentioned with reference to FIG. 1, in the embodiment, since there are the three distance sensors 41 to 43, the sensor unit 34 has three sets of combinations each comprising the distance sensor 13 and distance detector 12.

Reference numeral 33 denotes a display unit for sequentially reading out display data from a VRAM 10 by a display controller 9 and driving a projector 11 while executing a gradation conversion or the like. The display controller 9 executes a bus control so that an access from the CPU 1 to the VRAM 10 and an access to transfer data from the VRAM 10 to the display controller 9 don't collide. Further, the display controller 9 can also execute logical arithmetic operations such as AND, OR, EXOR, etc. between the contents of the VRAM 10 and a preset pattern. The projector 11 is a projector display for actually displaying and is constructed by a liquid crystal shutter, a projection light source, a lens, and the like.

A circuit construction of the sensor unit 34 will now be described with reference to FIG. 4. In the embodiment 1, an ultrasonic wave is generated from the distance sensor 13 and a time which is required until the reflected wave is returned is measured, thereby detecting the distance.

Figure 4:
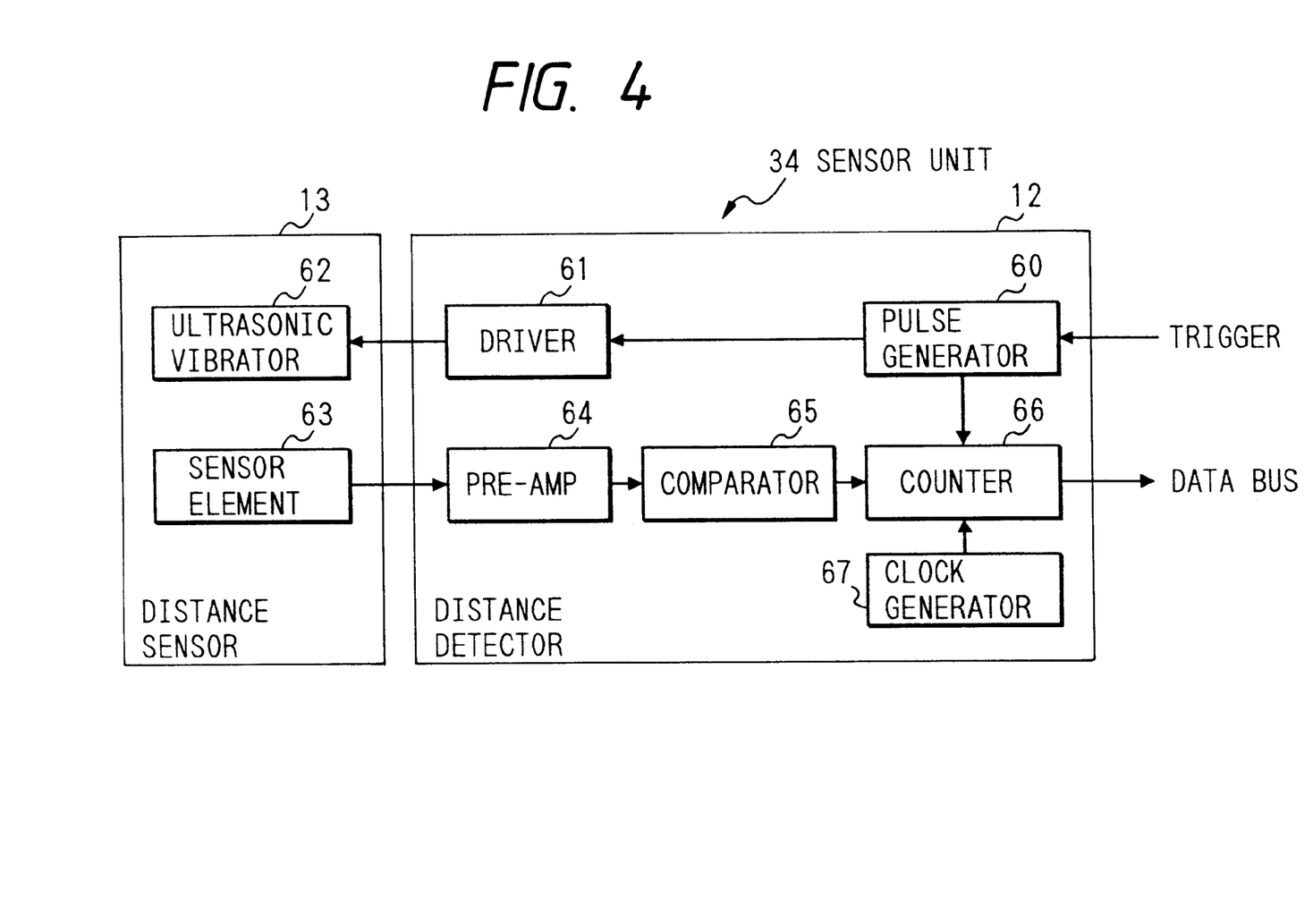
FIG. 4 is a block diagram showing a construction of a sensor unit in the embodiment 1.

FIG. 4 is a block diagram showing a construction of the sensor unit in the embodiment 1. A circuit construction of one distance sensor is shown. In FIG. 4, reference numerals 60 to 62 denote a circuit of an output system of an ultrasonic wave. Reference numeral 60 denotes a pulse generator for generating a start signal by a trigger signal from the CPU 1; 61 a driver for converting the start signal from the pulse generator 60 to a drive signal of an ultrasonic vibrator; 62 an ultrasonic vibrator using a material such as PZT (zircon lead titanate) or the like.

Reference numerals 63 to 67 denote a detecting circuit of an incident ultrasonic wave (reflected wave). First, reference numeral 63 denotes a sensor element using PZT similar to the vibrator 62; 64 a pre-amplifier for amplifying an output signal of the sensor element 63; 65 a comparator for converting an output signal of the pre-amplifier 64 to a digital level; and 66 a counter which is used to measure a delay time of the ultrasonic wave signal. The counter 66 clears a count value by an output signal of the pulse generator 60 and, at the same time, starts to count a clock pulse from a clock generator 67. The counter 66 stops the counting operation by an output of the comparator 65 and outputs the count data obtained to a data bus. Reference numeral 67 denotes the clock generator for generating operation clocks at predetermined time intervals for the counter 66.

Figure 5:
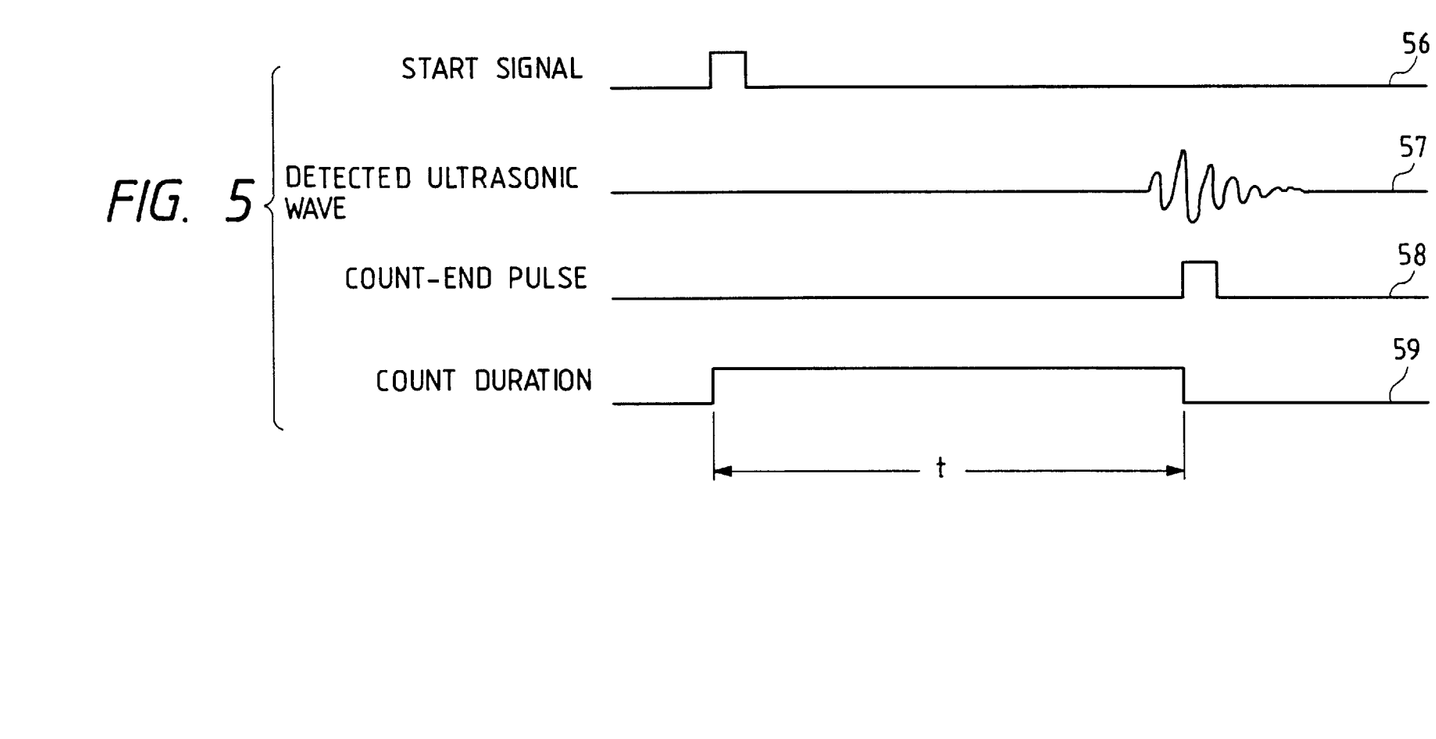
FIG. 5 is a timing chart for explaining operation timings of a sensor unit 34.

The operation of the sensor unit 34 will now be described with reference to a timing chart of FIG. 5. FIG. 5 is the timing chart for explaining an operation timing of the sensor unit 34.

Reference numeral 56 denotes a start signal which is outputted from the pulse generator 60. The driver 61 produces a drive signal at a timing of the start signal (56), so that the vibrator 62 is driven and generates an ultrasonic wave. The counting operation of the counter 66 is started by the start signal (56). Reference numeral 57 denotes an ultrasonic wave detection waveform which is outputted from the sensor element 63 when it receives the reflected wave. Reference numeral 58 denotes a digital level signal obtained by shaping the ultrasonic detection waveform (57) by the comparator 65. The signal (58) shows a timing to finish the counting operation of the counter 66 and is referred to as a count-end pulse. Reference numeral 59 denotes a counting period (period of time from the transmission of the ultrasonic wave to the reception of the reflected wave) of the counter 66.

On the basis of the data obtained by the above construction, a distance d between the display apparatus and the projection plane is calculated as follows. Now, assuming that a delay time which is required from a pulse output of the start signal (56) to the output of the count-end pulse (58) is set to t and a sound velocity is set to v, the distance d is obtained as follows.

$$d=(t \times v)/2 \tag{1}$$

In the embodiment, by executing the above processes with respect to the sensors 41 to 43, the distance data for three points on the projection plane is calculated. The distances which are measured by the distance sensors 41 to 43 are set to d1 to d3, respectively.

<Explanation of processing operation (FIGS. 6 to 9)>

An image correcting operation of the display apparatus of the embodiment 1 with the above construction will now be described in detail hereinbelow.

The display apparatus of the embodiment 1 detects an inclination of the projection plane at every predetermined time, thereby calculating an image correction value. When the screen is updated, an output image is deformed on the basis of the image correction value and, after that, data is outputted to the projector. Namely, the image data is corrected in accordance with the inclination between the projection plane and the projector and the corrected data is outputted, thereby preventing the distortion of the image due to the inclination of the projection plane. The process for detecting the inclination of the display screen is executed in an interruption routine which is activated by a timer.

Figure 6:
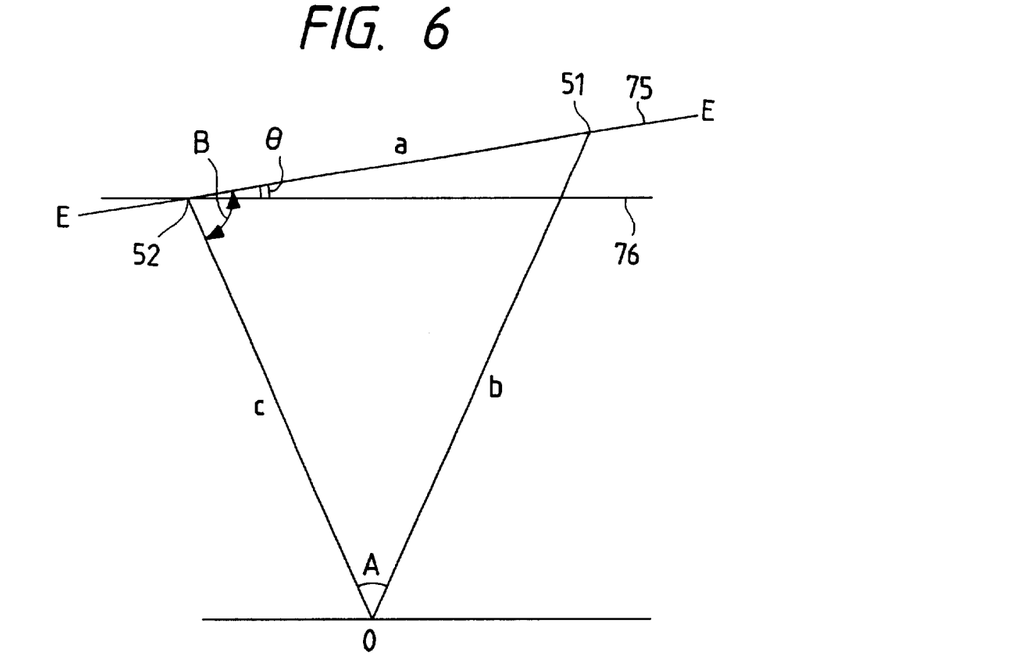
FIG. 6 is a diagram for explaining a method of detecting an inclination of a projection plane in the embodiment.

FIG. 6 is a diagram for explaining a method of detecting the inclination of the projection plane in the embodiment. A method of calculating the inclination of the projection plane will now be described with reference to FIG. 6.

In the embodiment, the inclination of the projection plane is calculated with respect to each of the vertical direction (Y direction) and the lateral direction (X direction). FIG. 6 shows a state when a plane including the lens of the apparatus and the two detection points (E—E cross section) of the distance sensors is seen from the top. In this state, an inclination θ in the X direction is calculated as follows.

In the diagram, a point O indicates a position of the projector lens; reference numeral 75 denotes a projection plane; and 76 a virtual plane (facing plane) which ideally faces the apparatus. The inclination θ of the projection plane to be obtained denotes an angle between the facing plane 76 and the projection plane 75. It is now assumed that a difference between angles in the detecting directions of two sensors is set to A, a distance between the apparatus and the detecting point 52 is set to c, and a distance between the apparatus and the detecting point 51 is set to b. In this case, the inclination θ of the projection plane is calculated as follows from a rule of elementary mathematics.

$$a = (b^2 + c^2 - 2 \cdot b \cdot c \cdot \cos A)^{1/2} \quad (2\text{-}1)$$

$$B = \arcsin\left(b \cdot \sin\frac{A}{a}\right) \quad (2\text{-}2)$$

$$\theta = B - \left(\frac{\pi}{2} - \frac{A}{2}\right) \quad (2\text{-}3)$$

An inclination in the Y direction can be also calculated by using the relations between the lens position O and the detecting points 52 and 53 in a manner similar to the above angle θ and assumes φ. An inclination angle (θ, φ) of the projection plane for the facing plane can be calculated as mentioned above.

An image display procedure by the display apparatus of the embodiment will now be described. In the embodiment, the inclination of the projection plane is detected by the foregoing method by the timer interruption. When the inclination of the projection plane changes, the correction value is calculated on the basis of the distances measured by the distance sensors 41 to 43. When an image is displayed onto the projection plane, the image data is changed (which will be explained hereinlater) on the basis of the correction value and the image is projected and outputted.

Figure 7:
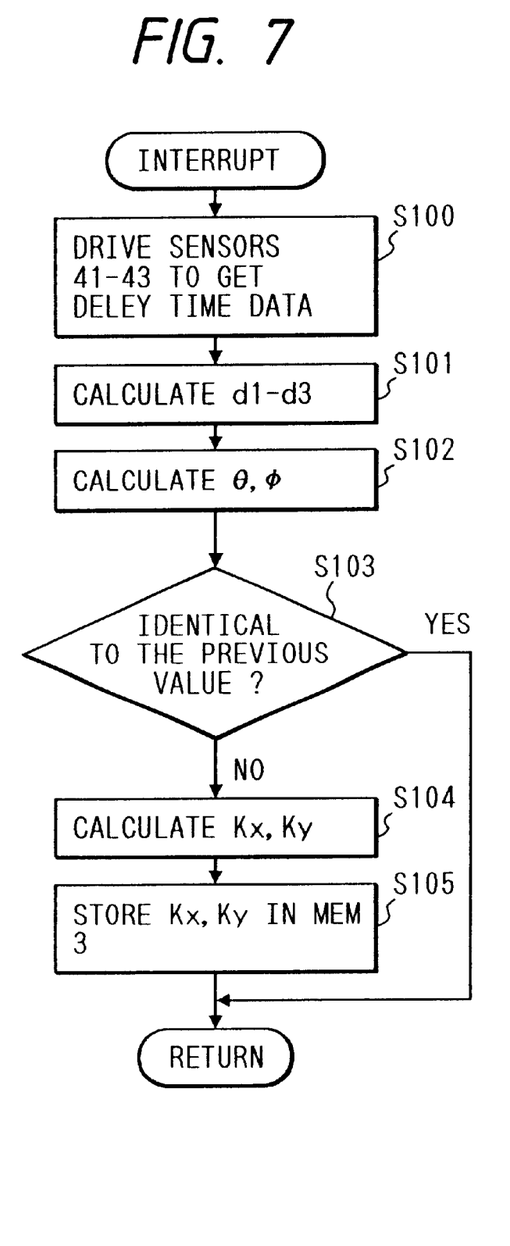
FIG. 7 is a flowchart showing a procedure for calculation of an image correction value that is activated by a timer interruption.

FIG. 7 is a flowchart showing a procedure for calculation of the image correction value that is activated by the timer interruption. In the processes of FIG. 7, the distances at three points are measured by the ultrasonic sensors, thereby obtaining the inclination of the projection plane. Subsequently, in the case where the image is projected to the projection plane arranged at such an inclination, the correction value for obtaining a projection image without any distortion in both of the vertical and lateral directions is calculated.

First in step S100, delay time data is obtained by driving the distance sensors 41 to 43. In step S101, the equation (1) is calculated with respect to each of the delay time data obtained in step S100, thereby calculating the distances d1 to d3. In step S102, the inclination angle (θ, φ) of the projection plane is calculated by using the equations (2-1) to (2-3) from the distances d1 to d3. In step S103, a check is made to see if the inclination of the projection plane coincides with that at the previous measurement or not. When they are identical, the processing routine is finished. When it is judged that the inclination of the projection plane is changed, step S104 follows.

In step S104, the correction value of the output image is calculated. In this step, by which times the right and lower edges are increased while setting the left upper point of the image to a reference point, the magnified image having the same size as a reference (left upper portion of the image) is obtained are calculated. The correction values in the X and Y directions are obtained. The correction values (Kx, Ky) in the X and Y directions are calculated by the following equation (3). That is, $$(Kx, Ky) = \left(\frac{d2}{d1}, \frac{d2}{d3}\right) \quad (3)$$

In step S105, the correction values calculated in step S104 are stored into the memory 3 and the processing routine is finished.

By activating the processes shown in FIG. 7 by the timer interruption as mentioned above, the inclination of the projection plane is detected and the image correction values can be calculated.

A flow of processes upon updating the screen will now be described.

Figure 8:
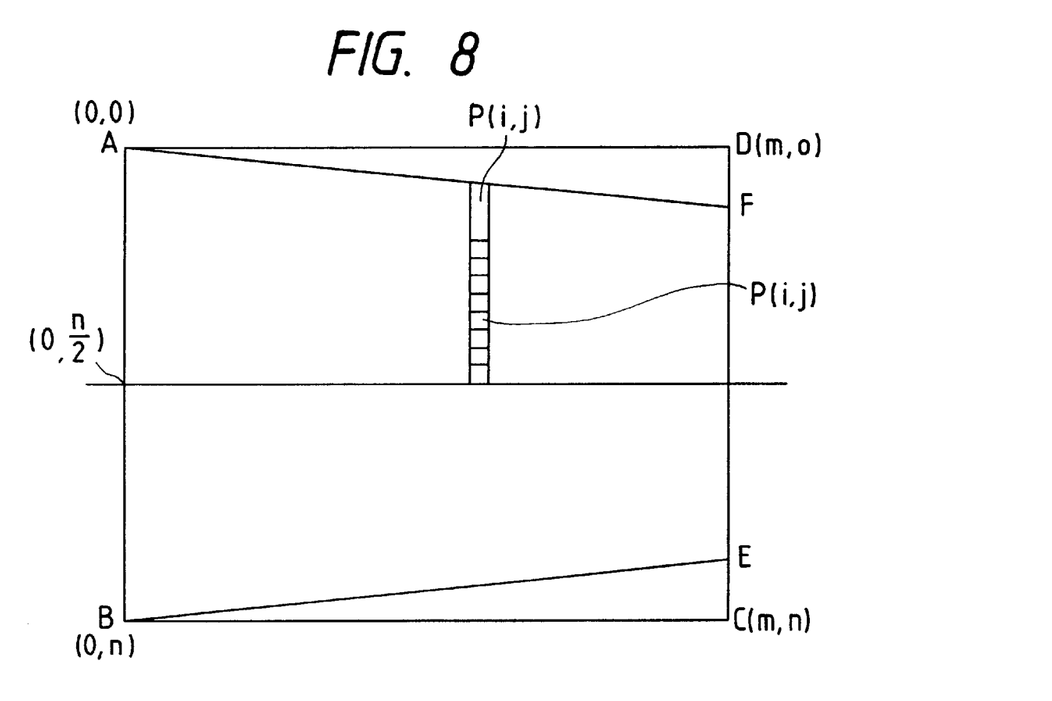
FIG. 8 is a diagram for explaining a method of a process for correcting a picture plane according to the embodiment.

FIG. 8 is a diagram for explaining a method of a correcting process of the screen according to the embodiment. In the diagram, the image data is constructed by (m×n) pixels. The left upper position is set to an origin, an X axis is provided in the lateral direction, and a Y axis is provided in the vertical direction. A quadrangle ABCD corresponds to mapping data of an image stored in the memory 3. A quadrangle ABEF corresponds to mapping data of an image which was corrected in the X direction (lateral direction). In the processes of the embodiment, the conversion from the quadrangle ABCD to the quadrangle ABEF is first executed. After that, a similar correction is executed in the vertical direction.

For example, in the case where the projection plane is inclined as shown in FIG. 6, the display image is enlarged as it approaches the right side. To reduce such a distortion of the display image, the image is changed as shown in FIG. 8 on the mapping data of the image. Namely, the image data is changed while increasing a reduction ratio in the vertical direction toward the right direction of the image. When the image data which was changed as mentioned above is projected onto the display screen inclined as shown in FIG. 6, the distortion which occurs by the projection and the distortion on the mapping data are set off, so that an image without a distortion is displayed on the projection plane 75.

In the above conversion, since the image data is converted to a trapezoidal figure, a conversion magnification changes as a converting position approaches the right side. Now, assuming that a magnification of the pixel of the i-th column is equal to Ki, Ki is calculated by the following equation (4) using the correction value Kx. Namely, $$Ki = Kx \times i / m \quad (4)$$

By deciding the value of a pixel p(i, j) of the i-th column by using Ki by the following equations (5-1) and (5-2), the magnification conversion in the column direction can be performed. In the conversion of the embodiment, a pixel (i, n/2) at the center of the column is set to the center of the conversion and calculations shown by the equations (5-1) and (5-2) are executed. Namely, the value of j is changed from 1 to n by using the equations (5-1) and (5-2) and the pixels are replaced, thereby executing the conversion of the i-th column.

The equations of the conversion are expressed as follows.

$$p(i, j) = p\left(i, \frac{n}{2} - \mathrm{int}\left(\left(\frac{n}{2} - j\right) / Ki\right)\right)\left(j = \frac{n}{2}, \frac{n}{2} - 1, \ldots 1\right) \quad (5\text{-}1)$$

-continued $$p(i, j) = p\left(i, \frac{n}{2} + \text{int}\left(\left(j+1-\frac{n}{2}\right)/Ki\right)\right) \quad (5\text{-}2)$$

$$\left(j = \frac{n}{2}+1, \frac{n}{2}+2, \ldots n\right)$$

For example, explanation will now be made with respect to the calculation such that (640×480) dots correspond to its display image and the conversion is executed to the column of p(10, j). It is now assumed that the enlargement magnification of the i-th column is two times, namely, the value of Ki is equal to 2. In this case, the value at each pixel position is as follows.

p(10, 240)=p(10, 240−int((240−240)/2))=p(10, 240)
p(10, 239)=p(10, 240−int((240−239)/))=p(10, 240) . . .
p(10, 1)=p(10, 240−int((240−1)/2))=p(10, 121)
p(10, 241)=p(10, 240+int((241+1−240)/2))=p(10, 241)
p(10, 242)=p(10, 240+int((242+1−240)/2))=p(10, 241) . . .
p(10, 480)=p(10, 240+int((480+1−240)/2))=p(10, 360)

It will be understood that by executing the above calculations, a range from p(10, 120) to p(10, 360) is enlarged to a range from p(10, 0) to p(10, 420) and the pixels of the tenth column are enlarged twice in the vertical direction.

It will be also understood that when the value of Kx is less than 1, the image is reduced as it approaches the right direction. For example, in case of the inclination of the projection plane as shown in FIG. 6, the image is enlarged as the image to be projected approaches the right direction. Therefore, Kx is set to a value less than 1 and the image data in the memory is reduced as the image approaches the right direction, so that the distortion of the image is set off.

By executing the converting processes using the equations (5-1) and (5-2) described above while changing the value of i from 1 to m, the converting process is executed with respect to each column and the image correction in the X direction is executed.

The conversion in the Y direction can be also executed in a manner similar to the foregoing converting process. First, a magnification Kj of each row is calculated by the following equation (6). After that, by executing the conversion by the following equations (7-1) and (7-2) for each row, the image correction in the Y direction is executed.

First, the magnification of each row is obtained by $$Kj = Ky \times j/n \quad (6)$$

Further, the converting process of each row can be obtained by the following equations.

$$p(i, j) = p\left(\frac{m}{2} - \text{int}\left(\left(\frac{m}{2}-i\right)/Kj\right), j\right)\left(i = \frac{m}{2}, \frac{m}{2}-1, \ldots 1\right) \quad (7\text{-}1)$$

$$p(i, j) = p\left(\frac{m}{2} + \text{int}\left(\left(i+1-\frac{m}{2}\right)/Kj\right), j\right) \quad (7\text{-}2)$$

$$\left(i = \frac{m}{2}+1, \frac{m}{2}+2, \ldots m\right)$$

By executing the correction in the lateral and vertical directions as described above and projecting it, the image in which the inclination of the projection plane was corrected is projected and the image without a distortion can be obtained.

Figure 9:
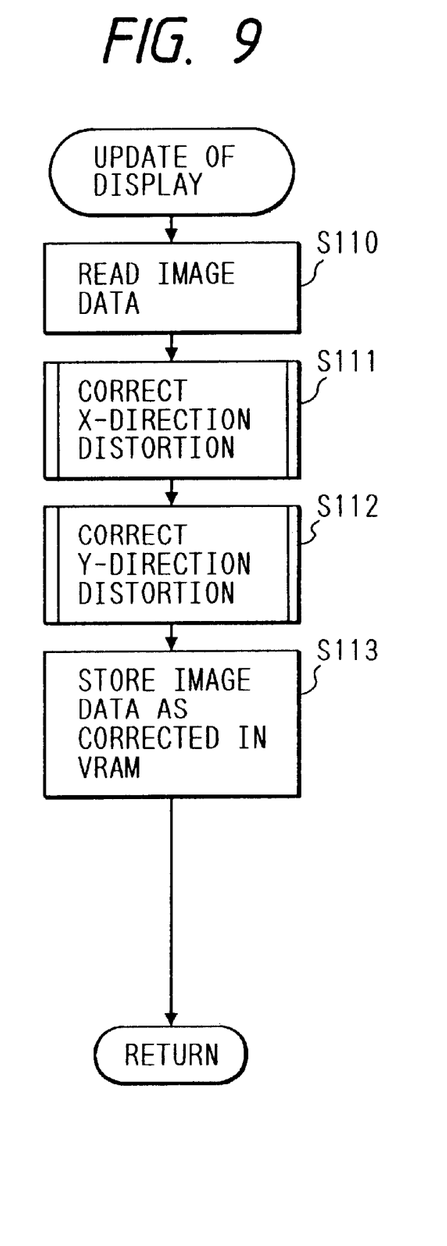
FIG. 9 is a flowchart showing a procedure for processes upon updating of the picture plane in the embodiment.

FIG. 9 is a flowchart showing a procedure for processes upon updating of the screen in the embodiment. First in step S110, the image data is read out from the HDD 4 or memory 3. In step S111, the converting processes are executed by using the above equations (4), (5-1), and (5-2) with respect to each pixel, thereby correcting a distortion in the X direction. Similarly, in step S112, the converting processes using the above equations (6), (7-1), and (7-2) are executed with respect to each pixel, thereby correcting a distortion in the Y direction. In step S113, the corrected image is written into the VRAM 10 and is displayed to the projection plane by the display controller 9 through the projector 11.

According to the embodiment 1 as described above, by detecting the inclination of the projection plane and deforming the output image so as to obtain a normal image on the projection plane, the display without a distortion can be obtained irrespective of the positional relation between the projection plane and the apparatus. Thus, the setting operation in which the positional relation between the projection plane and the projector is considered can be simplified and the use efficiency of the display apparatus can be improved.

Since the distortion of the image is corrected by operating the image data, a correcting mechanism such as an optical system or the like is unnecessary and a flexible and easy correction can be executed.

The invention is not limited to the foregoing embodiment but many variations and modifications are possible. For example, although the ultrasonic system has been used as a distance sensor in the embodiment 1, it can be also constructed by a photosensor. In such a case, it is sufficient to project a light from an LED or a laser diode to the projection plane and to detect a phase difference or intensity of the reflected wave, thereby measuring a distance.

[Embodiment 2 ]

The above embodiment 1 has been described with respect to the example in which the ultrasonic distance sensors are used to detect the inclination of the projection plane. In the embodiment 2, processes for fetching an image by a CCD camera and correcting a distortion by an image recognition will now be described.

<Explanation of circuit construction (FIG. 10)>

Figure 10:
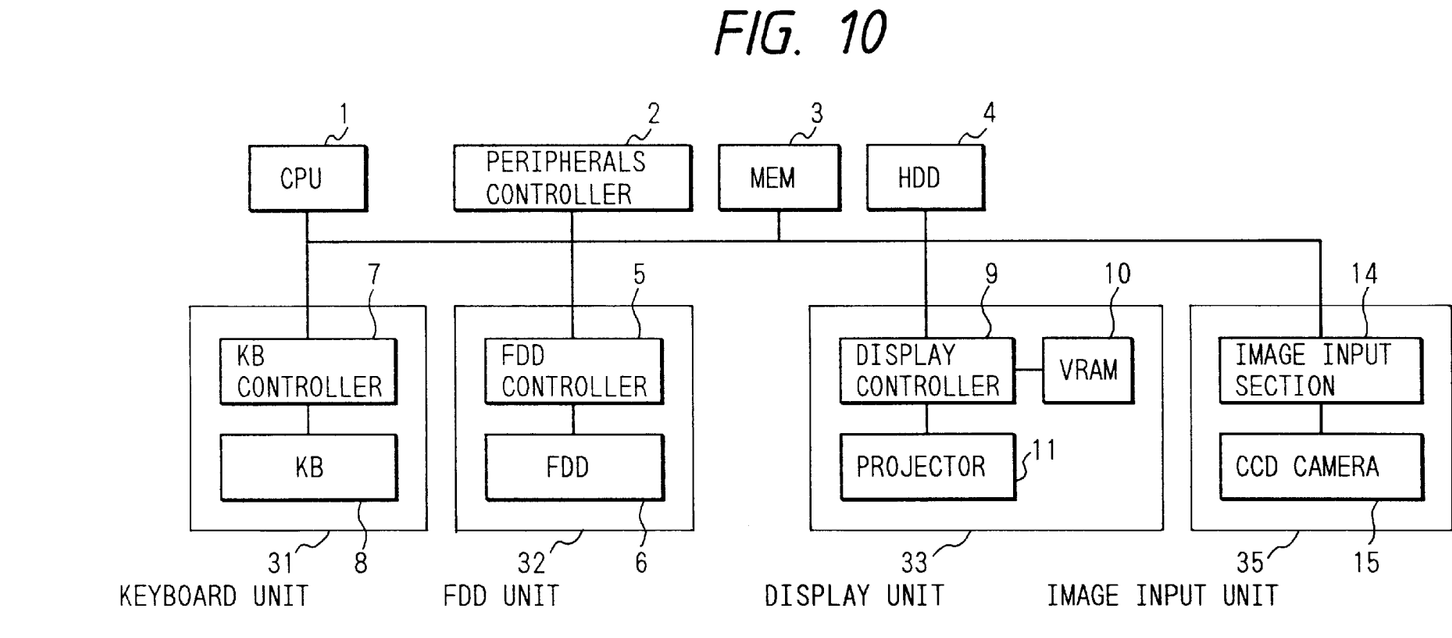
FIG. 10 is a block diagram showing a control construction of a display apparatus in an embodiment 2.

FIG. 10 is a block diagram showing a control construction of a display apparatus of the embodiment 2. In the diagram, component elements similar to those in the embodiment 1 are designated by the same reference numerals and their descriptions are omitted here.

In FIG. 10, reference numeral 35 denotes an image input unit for inputting a situation of the projection plane as image data. Reference numeral 15 denotes a CCD camera which is set to a position at which the whole projection plane can be photographed. Reference numeral 14 denotes an image input unit for amplifying an output signal of the CCD camera 15 and outputting as image data.

<Explanation of processing operation (FIGS. 11 and 12)>

The processing operation of the embodiment 2 will now be described hereinbelow.

In the display apparatus of the embodiment 2, an image of the projection plane is inputted when the use of the apparatus is started, and a distortion of the projection plane is detected by the image recognition. By repeating the detection of the distortion mentioned above while deforming the output image little by little, a correction value to provide a normal image is obtained. When the screen is updated, in a manner similar to the embodiment 1 mentioned above, the output data is converted in accordance with the correction value and the image data is outputted to the projector.

Figure 11:
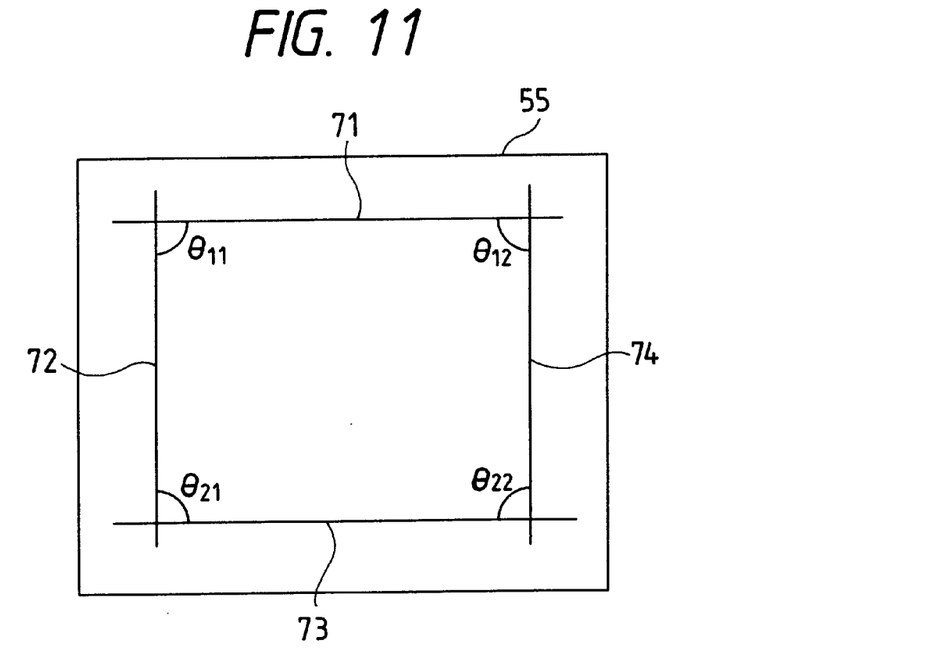
FIG. 11 is a diagram showing a test pattern which is displayed at the start of the use in the display apparatus of the embodiment 2.

FIG. 11 is a diagram showing a test pattern which is displayed at the start of the use in the display apparatus of the embodiment 2. In the diagram, reference numerals 71 to 74 denote straight lines which are displayed as test patterns.

A figure surrounded by four straight lines is a rectangle. In the processes of the embodiment 2, angles at the corners sandwiched by the straight lines are detected. The angle sandwiched by the straight lines 71 and 72 is equal to θ11, the angle sandwiched by the straight lines 71 and 74 is equal to θ12, the angle sandwiched by the straight lines 72 and 73 is equal to θ21, and the angle sandwiched by the straight lines 73 and 74 is equal to θ22, respectively.

Figure 12:
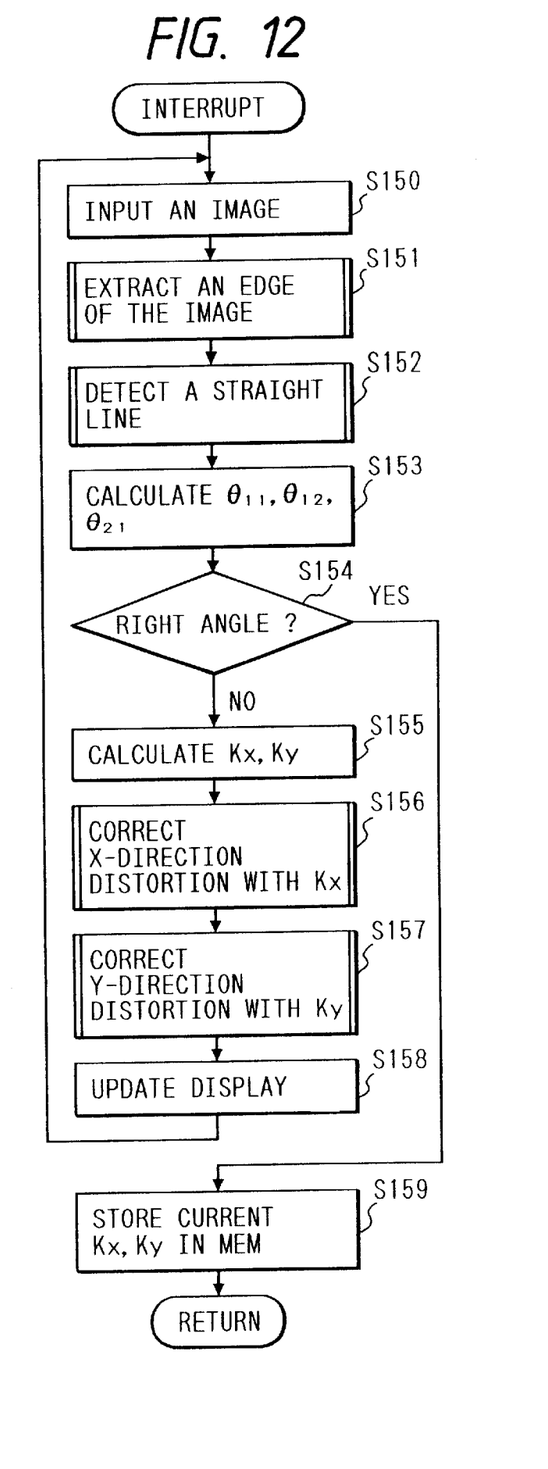
FIG. 12 is a flowchart showing a procedure for a process to detect an inclination of a projection plane in the embodiment 2.

FIG. 12 is a flowchart showing a procedure for processes to detect the inclination of the projection plane in the embodiment 2.

First in step S150, test patterns are displayed and the test pattern images are inputted from the image input unit 35. In step S151, after noises of the screen were eliminated, edges are extracted. In step S152, points constructing the edges are traced and the straight lines are detected. First, a dot train which is judged such that they belong to the same line segment is extracted and parameters of the straight line are calculated by using a method of least squares. This straight line is calculated as a pattern projected to the two-dimensional plane.

$$y = ax + b \quad (8)$$

In step S153, the angles θ11, θ12, and θ21 sandwiched by four straight lines constructing the boundary lines of the display area are calculated. The angle θ sandwiched by the straight lines l1 and l2 is calculated by the following equations.

$$l1: y = a1 \times x + b1 \quad (9\text{-}1)$$

$$l2: y = a2 \times x + b2 \quad (9\text{-}2)$$

$$\theta = \arctan \left| \frac{a1 - a2}{1 + a1 \times a2} \right| \quad (9\text{-}3)$$

Figure 13:
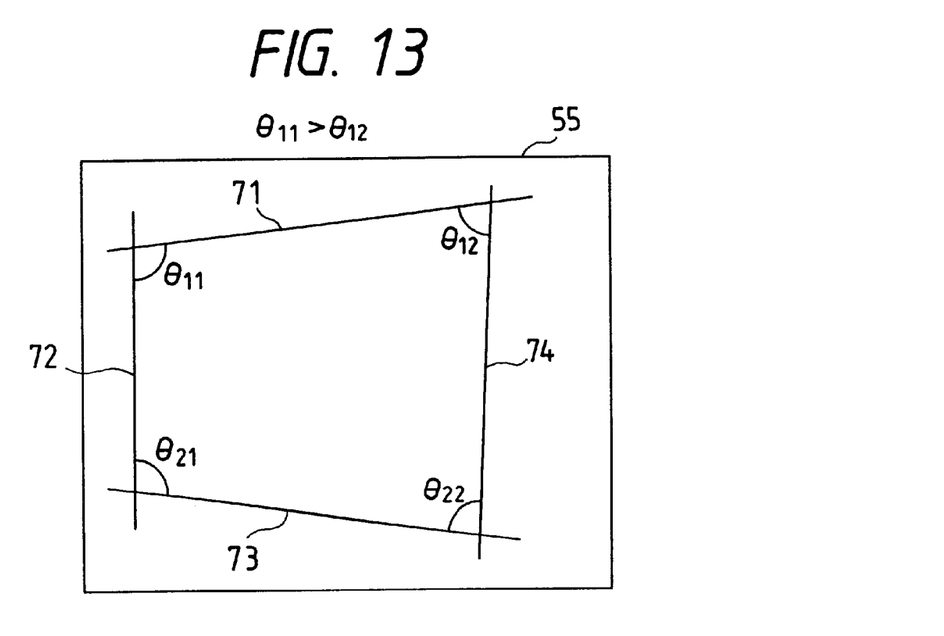
FIG. 13 is a diagram showing a display state of a test pattern in the case where a distortion occurs in an image.

In step S154, a check is made to see if the angles θ11, θ12, and θ21 formed by the straight lines are equal to a right angle or not. If YES, step S159 follows. If NO, step S155 follows. In step S155, the present correction values are changed. The following conditions are judged here and the correction values are changed with respect to each case. For example, the condition 1) is satisfied when the projection plane is directed to the right direction (namely, the state as shown in FIG. 6). Therefore, an image which is enlarged as it approaches the right direction is outputted. FIG. 13 is a diagram showing a display state of the test pattern in this instance. It is, therefore, necessary that the image data in the memory decreases as it approaches the right direction.

From the above construction, the relation between the magnitude relation between θ11 and θ12 and the changing direction of the X-direction correction value (Kx) and the relation between the magnitude relation between θ11 and θ21 and the changing direction of the 1) θ11>θ12, the X-direction correction value Kx is decreased
2) θ11<θ12, the X-direction correction value Kx is increased
3) θ11>θ21, the Y-direction correction value Ky is decreased
4) θ11<θ21, the Y-direction correction value Ky is increased Kx and Ky have numerical values larger than 0 and are set to values less than 1 under conditions of 1) and 2).

In step S156, the output image is corrected in the lateral direction by using Kx in a manner similar to the embodiment 1. In step S157, the output image is also corrected in the vertical direction by using Ky in a manner similar to the embodiment 1. In step S158, the image is corrected by using the obtained correction values. The corrected image is written into the VRAM 10 and is displayed to the projection plane. After that, the processing routine is returned to step S150 and the above processes are repeated.

In step S154, when it is judged that θ11, θ12, and θ21 are equal to the right angle, step S159 follows and the correction values at that time point are stored into the memory. The processing routine is finished.

The proper correction values in the X and Y directions are obtained while correcting the test pattern and the subsequent image output is executed by using the correction values. Since the updating process of the image in the image output is substantially similar to the process (FIG. 9) in the embodiment 1, its description is omitted here.

As described above, according to the embodiment 2, by inputting the image on the projection plane and deforming the output image, an effect that is almost similar to that in the foregoing embodiment 1 can be obtained. Since the proper correction values are obtained on the basis of the image which was actually projected, the more accurate correction can be executed.

Although, for example, θ11 and θ12 have been compared in the embodiment 2, it is also possible to detect a distortion in dependence on whether θ11 is larger than 90° or not and to detect the changing direction of the correction value. For example, when θ11 is equal to or larger than 90°, by reducing the correction value in the X direction, an effect similar to that in the embodiment 2 is obtained.

According to each of the embodiments described above, by detecting the inclination between the projection plane and the output optical axis, the output image can be deformed so as to form a normal image onto the projection plane. Therefore, there are effects such that even in the case where the distance to the projection plane and the inclination thereof are changed, the distortion of the screen can be easily corrected and the image output of a high quality can be always obtained. Thus, the apparatus can be promptly installed and moved and the use efficiency of the apparatus can be improved.

Although the left upper position of the image has been always set to the reference point and the image has been enlarged or reduced in the vertical or lateral direction in the above embodiments, the invention is not limited to such a construction. For example, when converting to a trapezoid, by setting a reference point to the side of a longer line, the conversion of the image is always executed in the reducing direction. That is, when the projection plane is inclined as shown in FIG. 6, by setting the reference point to the side AB in FIG. 8, and when the projection plane is inclined in the direction opposite to FIG. 6, by setting the reference point to the side CD in FIG. 8, the image is converted in the reducing direction. With such a construction, there are effects such that when the image is enlarged on the basis of the correction value, although there is a possibility such that a part of the image of the enlarged portion cannot be displayed (lost), by always converting in the reducing direction, the lost of image can be prevented.

Further, although the above embodiments have been described with respect to the example in the case where the projector has been arranged in front of the projection plane, the invention can be also applied to a rear projector in which the projector is arranged behind the projection film plane.

Further, although the correction values have been obtained by using the distance to the projection plane in the embodiment 1, it is also possible to fetch a display image of a rectangular test pattern as shown in the embodiment 2 and to decide the correction values so that the test pattern becomes a correct rectangle.

In the construction of the embodiment 1, in the case where it is guaranteed that the deviation between the direction of the normal line of the projection plane and the direction of the optical axis of the projection light of the display apparatus doesn't exist in the vertical direction (Y direction) (namely, $\phi=0$), there is no need to measure the distances (d1 to d3) to three points. Namely, it will be obviously understood that it is sufficient to measure the distances d1 and d2 to two points 51 and 52 and to obtain the correction value Kx in the X direction and to change the image data in the lateral direction.

The invention can be applied to a system constructed by a plurality of equipment or can be also applied to an apparatus comprising one equipment. The invention can be also applied to the case where it is accomplished by supplying a program for executing the processes specified by the invention to the system or apparatus.

According to the invention as described above, on the basis of the deviation between the direction of the optical axis of the projection light and the direction of the normal line of the projection plane, the image data can be changed and displayed so as to set off the distortion of the display image which occurs by the deviation. The quality of the display image is raised and the use efficiency is improved.

According to another construction of the invention, a change amount of the image data to set off the distortion of the display image which occurs on the basis of the deviation between the optical axis direction of the projection light and the normal line direction of the projection plane is decided by detecting the distortion of the image displayed on the projection plane, and the more proper change amount of the image data can be obtained.

What is claimed is:

1. A display apparatus for displaying information by projecting a light onto an external projection plane, comprising:

projection means for projecting a quadrangular image on the projection plane;

angle detecting means for detecting four angles of the quadrangular image;

recognizing means for recognizing the image projected on the projection plane;

deviation detecting means for detecting a deviation amount of the image on a basis of the four angles detected by said angle detecting means;

changing means for changing output image data so as to offset a distortion of the displayed image on the basis of the deviation amount detected by said detecting means; and display control means for controlling said projection means to display the image by using the image data changed by said changing means, wherein said projection means and said detecting means are arranged in a single body.

2. An apparatus according to claim 1, wherein said changing means reduces or enlarges output image data while changing magnifications in lateral and vertical directions so as to offset the distortion of the display image due to the deviation amount on the basis of the deviation amount detected by said detecting means.

3. An apparatus according to claim 1, wherein the detection of the deviation amount by said detecting means is periodically executed at a predetermined time interval.

4. A display apparatus for displaying information by projecting a light onto an external projection plane, comprising:

obtaining means for repeating processes such that a quadrangular image displayed on the projection plane is fetched, four angles of the quadrangular image are detected, the projected image is recognized, its distortion is detected based on the four angles detected, image data is corrected so as to eliminate the distortion, and the image is displayed on the projection plane, thereby obtaining a proper correction amount to eliminate the distortion;

changing means for changing output image data on the basis of the correction amount obtained by said obtaining means; and display means for displaying the image onto the projection plane by using the output image data changed by said changing means.

5. An apparatus according to claim 4, wherein said obtaining means includes:

fetching means for displaying a test pattern onto the projection plane and fetching the test pattern image;

detecting means for detecting a distortion of the test pattern image by comparing the test pattern image fetched by said fetching means and an original test pattern; and test pattern changing means for changing image data of the test pattern on the basis of the distortion detected by said detecting means, and wherein processes of said fetching means, said detecting means, and said changing means are repeated until the distortion of the test pattern image fetched by said fetching means is smaller than a predetermined size, thereby obtaining a proper correction amount of the image.

6. An apparatus according to claim 5, wherein the test pattern is constructed by a plurality of straight lines which perpendicularly cross each other, and said detecting means detects the distortion of the test pattern image on the basis of angles which are formed by intersection of the straight lines in the test pattern image.

7. A display method of displaying information by projecting a light onto an external projection plane, comprising the steps of:

projecting a quadrangular image on the projection plane via a projector;

detecting four angles of the quadrangular image;

recognizing the image projected on the projection plane;

detecting a deviation amount of the image on a basis of the four angles detected;

changing output image data on the basis of a deviation amount detected in said detecting step; and controlling the image projection to display the image by using the image data changed in said changing step.

8. A display method of displaying information by projecting a light onto an external projection plane, comprising the steps of:

repeating processes such that a quadrangular image displayed on the projection plane is fetched, four angles of the quadrangular image are detected, recognizing the projected image, detecting distortion based on the four angles detected, correcting image data so as to eliminate the distortion, and displaying the image on the projection plane, thereby obtaining a proper correction amount to eliminate the distortion;

changing output image data on the basis of the correction amount obtained in the obtaining step; and displaying the image onto the projection plane by using the output image data changed in the changing step.

* * * * *

UNITED STATES PATENT AND TRADEMARK OFFICE
CERTIFICATE OF CORRECTION

PATENT NO.     : 6,310,662 B1
DATED          : October 30, 2001
INVENTOR(S)    : Shinichi Sunukawa et al.

It is certified that error appears in the above-identified patent and that said Letters Patent is hereby corrected as shown below:

<u>Drawings,</u>
SHEET 6, FIG. 7, "DELEY" should read -- DELAY --.

<u>Column 8,</u>
Line 65, "$p(i,j)=p(i, \frac{n}{2} - int((\frac{n}{2}-j)/Ki))(j=\frac{n}{2}, \frac{n}{2}-1, ... 1)$" should read --$p(i,j)=p(i, \frac{n}{2} - int((\frac{n}{2}-j)/Ki))$ ¶$(j=\frac{n}{2}, \frac{n}{2}-1, ... 1)$--.

Column 9,
Line 15, "p(10, 239)=p(10, 240–int((240–239)/))=p(10, 240) ..." should read -- p(10, 239)=p(10, 240–int((240∇239)/2))=p(10, 240) ... --
Line 52, "$p(i,j)=p(i, \frac{n}{2} - int((\frac{n}{2}-j)/Ki))(j=\frac{n}{2}, \frac{n}{2}-1, ... 1)$" should read --$p(i,j)=p(i, \frac{n}{2} - int((\frac{n}{2}-j)/Ki))$ ¶$(j=\frac{n}{2}, \frac{n}{2}-1, ... 1)$--.

Column 12,
Line 59, "lost" should read -- loss --.

Signed and Sealed this

Second Day of July, 2002

*Attest:*

*Attesting Officer*

JAMES E. ROGAN
*Director of the United States Patent and Trademark Office*